United States Patent
Wekell (10) Patent No.: US 10,866,213 B2
(45) Date of Patent: Dec. 15, 2020

(54) EDDY CURRENT PROBE (71) Applicant: Zetec, Inc., Snoqualmie, WA (US)

(72) Inventor: William Oren Wekell, Maple Valley, WA (US)

(73) Assignee: Zetec, Inc., Snoqualmie, WA (US)

(*) Notice: Subject to any disclaimer, the term of this patent is extended or adjusted under 35 U.S.C. 154(b) by 67 days.

(21) Appl. No.: 16/172,039

(22) Filed: Oct. 26, 2018

(65) Prior Publication Data

US 2019/0128846 A1 May 2, 2019

Related U.S. Application Data (60) Provisional application No. 62/577,926, filed on Oct. 27, 2017.

(51) Int. Cl.
G01N 27/82 (2006.01)
G01N 27/90 (2006.01)

(52) U.S. Cl.
CPC ....... G01N 27/9033 (2013.01); G01N 27/902 (2013.01)

(58) Field of Classification Search
CPC .... G01N 27/82; G01N 27/90; G01N 27/9033; G01N 27/902; G01N 27/9026; G01N 27/904; G01N 27/9006; G01N 27/9013
See application file for complete search history.

(56) References Cited

U.S. PATENT DOCUMENTS

| 6,727,691 | B2 | 4/2004 | Goldfine et al. |
| 6,784,662 | B2 | 8/2004 | Schlicker et al. |
| 6,952,095 | B1 | 10/2005 | Goldfine et al. |
| 7,078,895 | B1 | 7/2006 | Shoji |
| 7,888,932 | B2 | 2/2011 | McKnight et al. |
| 8,018,228 | B2 | 9/2011 | Lepage et al. |
| 8,319,494 | B2 | 11/2012 | Simek et al. |
| 2005/0007108 | A1 | 1/2005 | Dogaru |
| 2005/0140355 | A1* | 6/2005 | Yamada ............... G01R 15/205 324/137 |
| 2006/0158181 | A1* | 7/2006 | Shoji ..................... G01N 27/82 324/240 |
| 2007/0222439 | A1* | 9/2007 | Wang ................... G01N 27/902 324/242 |
| 2010/0007342 | A1 | 1/2010 | Lepage et al. |
| 2013/0193960 | A1* | 8/2013 | Nishimizu ............. G01N 27/82 324/240 |
| 2013/0199279 | A1 | 8/2013 | Boles et al. |
| 2013/0214771 | A1 | 8/2013 | Tiernan et al. |

(Continued)

OTHER PUBLICATIONS

PCT International Search Report and Written Opinion issued for corresponding international application No. PCT/US2018/057711, dated Feb. 7, 2019, 6 pages.

Primary Examiner — Thang X Le (74) Attorney, Agent, or Firm — Snyder, Clark, Lesch & Chung, LLP (57) ABSTRACT A flexible eddy current probe for non-destructive testing of a metallic object, the probe having a flexible printed circuit containing eddy current drive and sense coils and a rotary encoder configured to measure liner distance as the eddy current probe is scanned over the object. The probe features an encoder arm that adjustably connects a flexible eddy current sensor array to the rotary encoder.

16 Claims, 10 Drawing Sheets (56) References Cited

U.S. PATENT DOCUMENTS

| | | | |
|---|---|---|---|
| 2015/0002144 A1* | 1/2015 | Boecker | G01N 27/9026 324/240 |
| 2015/0115945 A1* | 4/2015 | Bureau | G01N 27/9033 324/242 |
| 2016/0025682 A1 | 1/2016 | Walker et al. | |
| 2017/0176294 A1 | 6/2017 | Shumka et al. | |

* cited by examiner

EDDY CURRENT PROBE

CROSS REFERENCE TO RELATED APPLICATION

This application claims priority under 35 U.S.C. § 119, based on U.S. Provisional Patent Application No. 62/577,926 filed Oct. 27, 2017 entitled "Eddy Current Probe." The entire disclosure of this provisional application is incorporated herein by reference.

BACKGROUND

Eddy current sensors are one device that may be used in non-destructive testing of metal objects. An alternating current is applied to an excitation coil placed in close proximity to the metal object under test. The alternating current induces an alternating current in the object, which can be sensed either by a separate sensor or by the effect on the impedance of the excitation coil. The relationship between the applied current and the sensed signal can indicate the integrity of the material and reveal problems such as original imperfections, weld integrity, corrosion and wear-related weaknesses.

Eddy current testing of a large conductive surface may be made using an array of coils that is scanned over the surface in one or more swaths. The coils may be arranged in rows perpendicular to the scan direction to inspect larger swaths of the surface area of the object.

The material under test can be flat or it can have complex shape or curvature such as might be found in a raised weld bead. One particularly difficult geometry is that found in a butt weld pipe joint. The intersection of the positive curvature of the pipe exterior with the positive curvature of the circumferential weld crown bead and the negative curvature of the joining area at the toe of the weld are an exemplary challenge. One common area of defect is the joint between the weld and the base material, which is called the toe of the weld. This toe area is difficult for an eddy current probe to reach because of the planar nature of typical array assemblies in current use. Eddy current excitation coils need to be close to the material under test for good flaw detection and signal quality. Thus, there is a need for a flexible probe that can keep the excitation coils and sensing devices, whether coils or other sensors, close to the object under test even in complex-shaped areas of the object.

DETAILED DESCRIPTION OF PREFERRED EMBODIMENTS

Those skilled in the art will recognize other detailed designs and methods that can be developed employing the teachings of the present invention. The examples provided here are illustrative and do not limit the scope of the invention, which is defined by the attached claims. The following detailed description refers to the accompanying drawings. The same reference numbers in different drawings may identify the same or similar elements.

Figure 1:
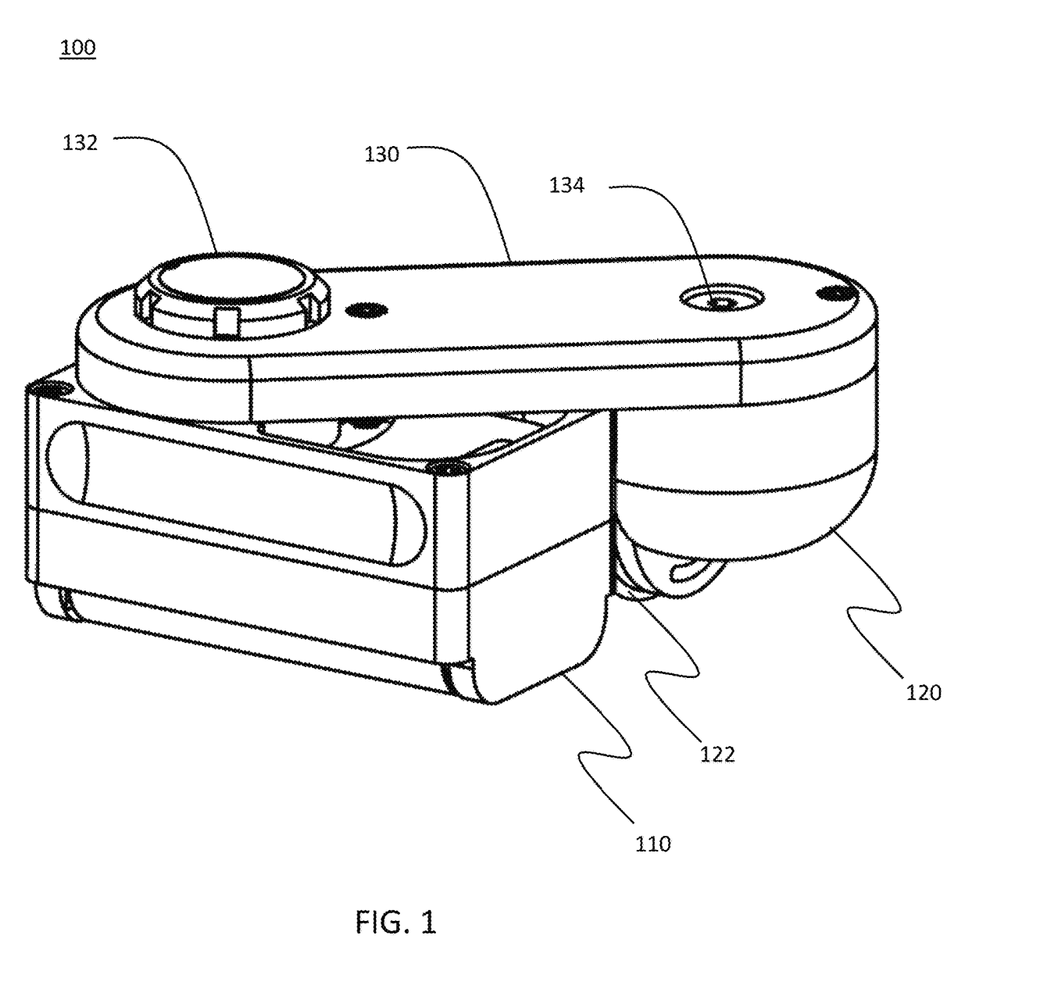
FIG. 1 is an isometric view of an exemplary flexible eddy current probe.

FIG. 1 shows one exemplary embodiment of a flexible eddy current probe 100. The probe has an eddy current sensor head 110, which is connected to an encoder wheel assembly 120 by an encoder arm 130. The eddy current sensor head 110 pivots with respect to the encoder arm at joint 132 and the encoder wheel assembly 120, having an encoder wheel 122, pivots with respect to the encoder arm 130 at joint 134. The encoder wheel 122 rolls along the surface of an object being scanned by the eddy current sensor head 110 to record the relative linear position of the sensor head 110 as the sensor head is moved across the surface of the object being scanned.

Figure 2:
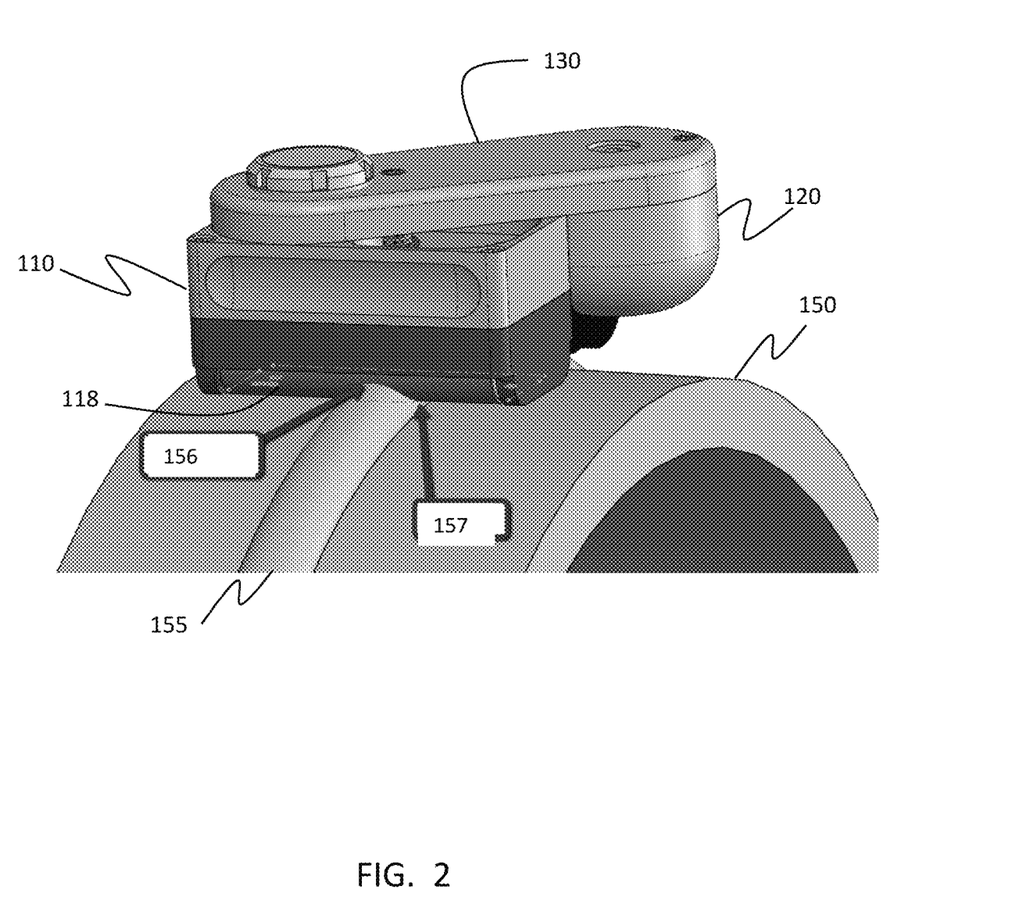
FIG. 2 illustrates the flexible eddy current probe of FIG. 1 in use on a section of welded pipe.

FIG. 2 shows one exemplary embodiment of the flexible eddy current probe 100 on a section of welded pipe 150. The probe 100 is shown with the probe wear surface 118 flexing over a weld 155, having a weld crown 156 and a weld toe 157. It can be seen that the probe wear surface 118 conforms to the shape of the weld 155.

Figure 3A:
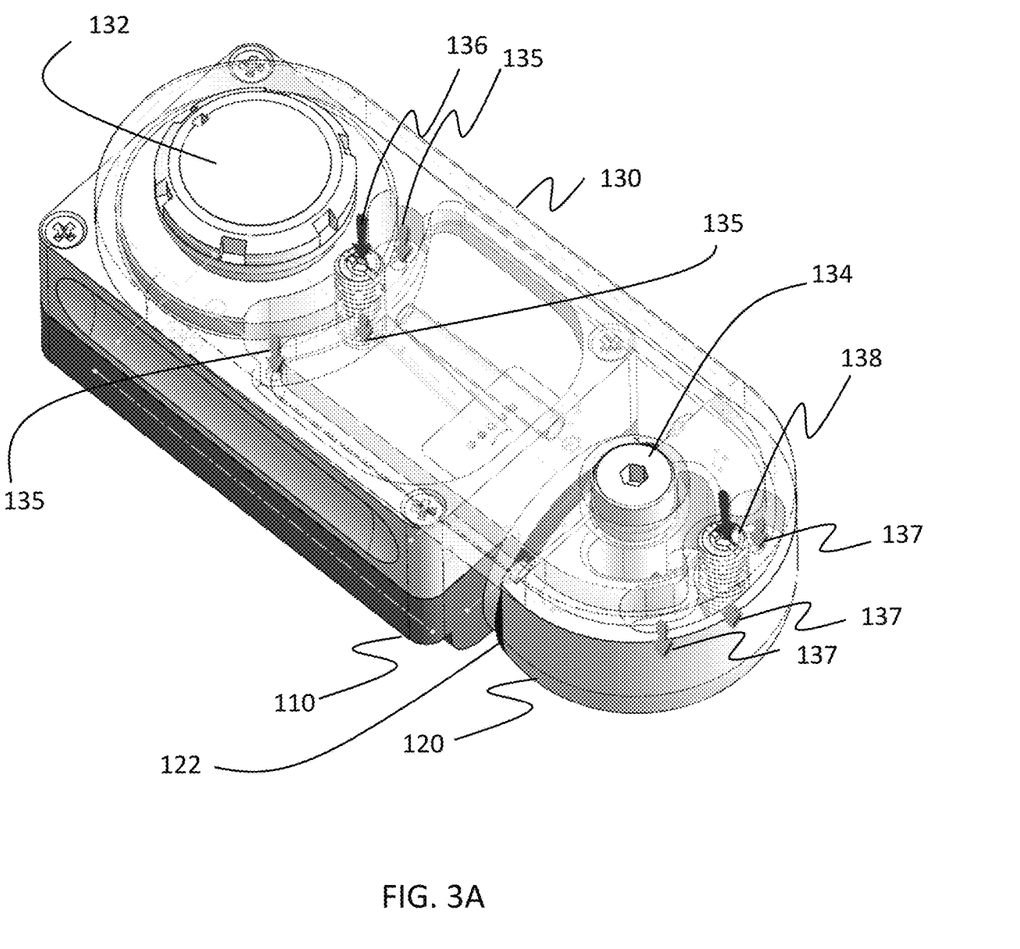
FIG. 3A is a top, isometric, transparent view of the flexible eddy current probe of FIG. 1.

FIG. 3A illustrates a top isometric transparent view of the encoder arm 130 showing a first set of three alignment detent holes (indicated by three grey arrows) 135 and a corresponding pin and spring assembly (indicated by a single black arrow) 136 at the sensor head joint 132 and a second set of three alignment detent holes (indicated by three grey arrows) 137 and a second pin and spring assembly (indicated by a single black arrow) 138 at the encoder joint 134. The two sets of alignment detent holes and pin and spring assemblies allow the encoder arm 130 to be placed into three different locked positions with respect to the sensor head 110 and the encoder assembly 120.

Figure 3B:
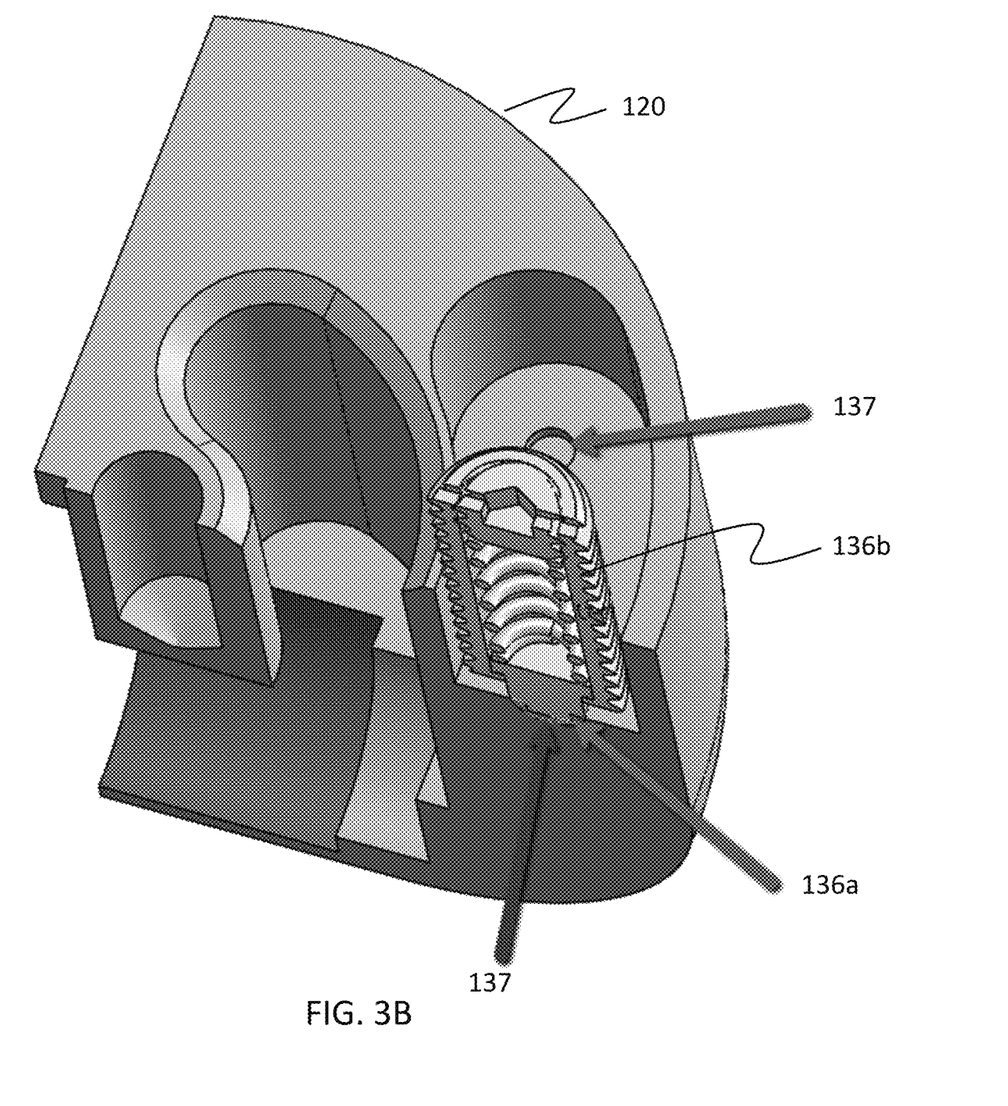
FIG. 3B is a top, isometric, cutaway view of the encoder assembly of the flexible eddy current probe of FIG. 1.

The pin and spring assembly 138 associated with the encoder assembly 120 is shown in cross section in FIG. 3B. As shown in FIG. 3B, pin 138a of the pin and spring assembly 138 is configured to fit into one of the alignment detent holes 137. Because the holes are shallow and the pin 138a is rounded on the end, the pin 138a releases against the force of the spring 138b when the encoder assembly 120 is forcefully rotated with respect to the encoder arm 120 (not shown in FIG. 3B). The pin 138a will automatically engage into one of the three alignment detent holes 135 when the encoder assembly 120 is rotated with respect to the encoder arm 120 to a position that corresponds to that detent hole. The pin and spring assembly 136 and alignment detent holes 135 associated with the eddy current sensor head 110 operate in the same manner as described here for the parts associated with the encoder assembly.

Returning to FIG. 3A, the encoder arm 130 is shown parallel to the eddy current sensor head 110 with the encoder assembly 120 set so that the encoder wheel 122 is alongside the eddy current sensor head 110. There are two other sensor/arm/wheel settings, one of which is shown in FIGS.

1 and 2. The three-position feature of this exemplary embodiment is only one way to keep the encoder wheel 122 properly aligned, i.e., with the axis of encoder wheel 122 parallel with respect to the eddy current sensor head 110. A greater or fewer number of fixed holes and other mechanical configurations may be used to align the encoder wheel 122 with respect to the eddy current sensor head 110. For example, gears or a belt may be used to directly connect the encoder assembly 120 with the sensor head 110 so that they maintain a consistent relative angular relationship as the encoder arm 130 is rotated about the sensor head 110.

Figure 4:
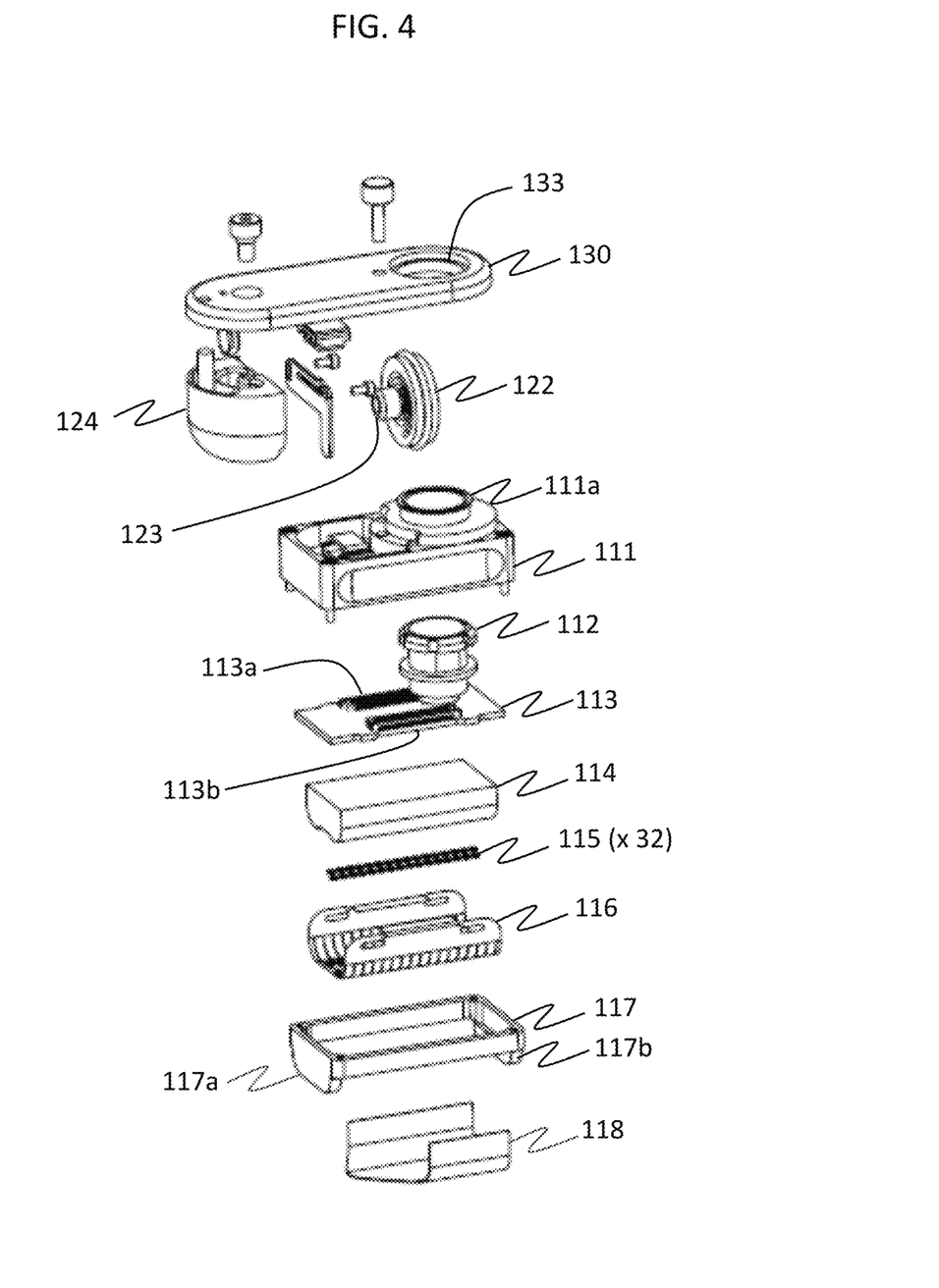
FIG. 4 is an exploded view of the flexible eddy current probe of FIG. 1.
Figure 5A:
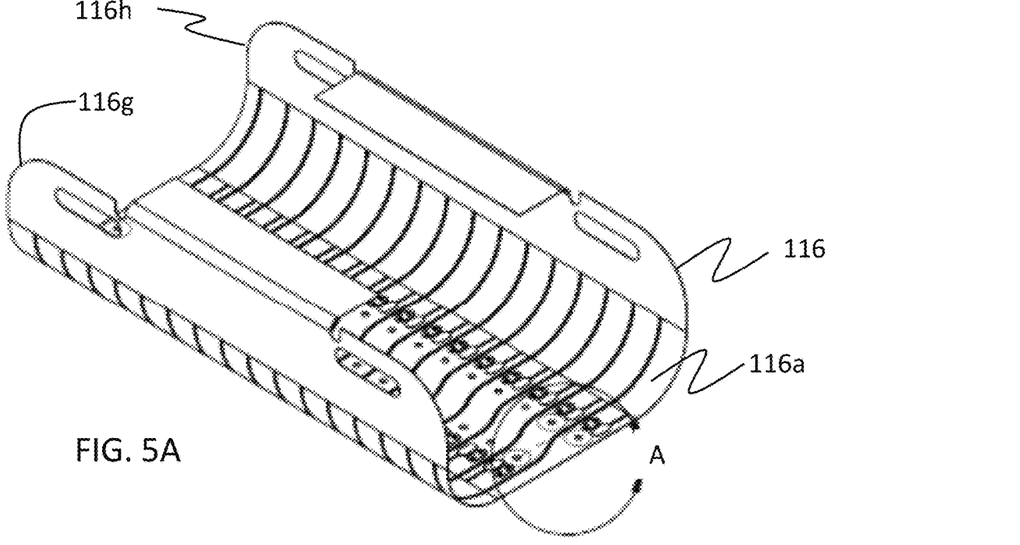
FIG. 5A is an isometric view of an exemplary flex circuit.
Figure 5B:
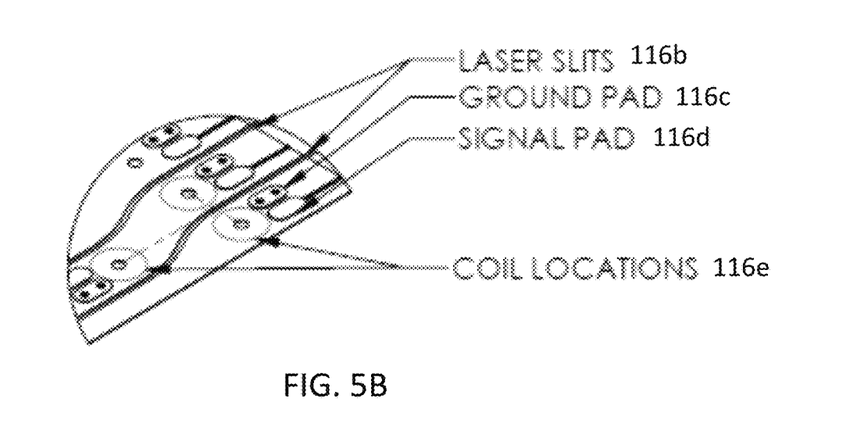
FIG. 5B is a detailed view of a portion of the exemplary flex circuit of FIG. 5A

FIG. 4 is an exploded view of eddy current probe 100. As shown, encoder arm 130 connects a rotary encoder that includes an encoder housing 124 and encoder wheel 122, to a flexible eddy current sensor head 110, which will now be described in detail. In particular, flexible eddy current sensor head 110 has an eddy current sensor housing 111, which includes a cylindrical portion 111a that mates with and rotates in an opening 133 in the encoder arm 130. An electronics assembly 113 fits into the sensor housing 111 and includes an electrical connector 112. The electronics assembly 113 may include a printed circuit board (PCB) and may include passive and active electronic components. Consistent with embodiments described herein, a flex circuit 116 connects to the electronics assembly 113 via flex circuit connectors 113a, 113b. Flex circuit 116 is utilized for ease of assembly and low cost of construction. Exemplary details of flex circuit 116 are described in additional detail below. In this exemplary embodiment, 32 sensor coils 115 are mounted on and electrically connected to the flex circuit 116. In other embodiments more or less coils may be used. The invention is not limited to the use of coils as current sensors. For example. Anisotropic magnetoresistive sensors, giant magnetoresistive sensors, and Hall Effect sensors may all be used to sense current instead of coils. Behind the flex circuit 116 (i.e., between flex circuit 116 and sensor housing 111) is a foam coil support 114. The foam coil support 114 provides structural support to flex circuit 116 to stiffen the flex circuit 116 and limit flexure, while allowing the flex circuit to bend to confirm to the shape of the object being tested.

As shown in FIG. 4, eddy current probe 100 also includes a flexible wear surface 118 that protects the flex circuit 116 and that can be replaced when worn out. The eddy current probe is designed to be slid in contact over the object to be tested, which may involve considerable friction and rough areas over which the wear surface must ride. Thus, the wear surface 118 is designed to be replaceable. The eddy current probe also includes a guide frame 117. The guide frame 117 has two guide surfaces 117a, 117b that glide over the object to be tested and limit the amount of pressure that can be applied to the wear surface 118 and to the underlying flex circuit 116.

As briefly described above, eddy current sensor head 110 includes flex circuit 116, as shown in FIGS. 4, 5A, 5B, 6 and 7. The flex circuit 116 may be composed of a laminate of conductive traces, typically of copper and insulating layers typically of a polyimide film. The flex circuit 116 may be substantially rectangular (e.g., having first and second opposing, parallel sides and third and fourth opposing parallel sides) and may include a plurality of adjacent strips 116a, with each strip being configured to hold and connect to one or two sensor coils 115. Consistent with implementations described herein, flex circuit strips 116a are made by laser cutting elongate slits 116b in the flex circuit 116. These slits 116b isolate the strips 116a and coils 115 on the strips to independently suspend them. Each strip 116a is contiguous at its ends with the sides 116g, 116h of the flex circuit 116. The coils 115 may be separate parts, such as bobbin wound coils applied to the flex circuit or may be built integrally by the flex circuit traces themselves. The orientation of the slits 116b, perpendicular to the coil row axes 116f, provides greater flexibility between the coils, allowing them the freedom to follow the surface of the object under test more closely as the sensor head 110 is moved across the object under test. As described above, the interdigitated surface of the flex circuit 116 is backed by foam coil support 114, which may be formed of a compliant plastic foam (e.g., Poron®, available from Rogers Corp., Woodstock, Conn.). Foam coil support 114 communicates the force of the probe being held against the object under test to the flex circuit 116 and coils 115. The plurality of strips 116a that independently flex make the probe especially useful in testing welded pipe as shown in FIG. 2. Each strip 116a is free to conform to the portion of the pipe or weld section against which it is placed without affecting the position of adjacent strips. This places the sensor coils 115 as close as possible to the pipe and weld, including the difficult areas of the weld crown 156 and toe 157. Figure detail 5B shows exemplary ground pads 116c and a signal pads 116d for connecting to discrete coils, which may be located at coil locations 116e.

Figure 6:
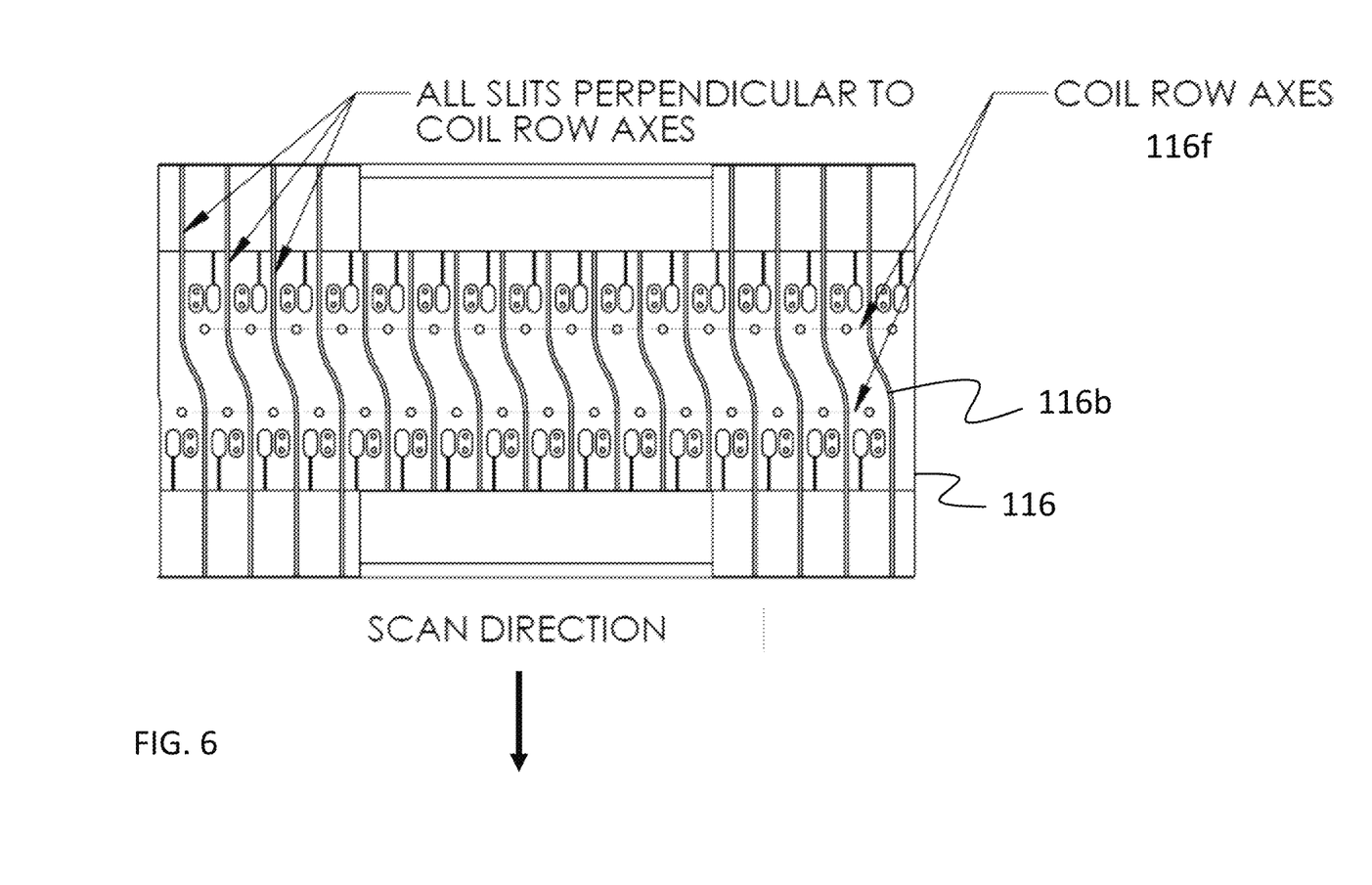
FIG. 6 is a top view of the exemplary flex circuit of FIGS. 5A and 5B.
Figure 7:
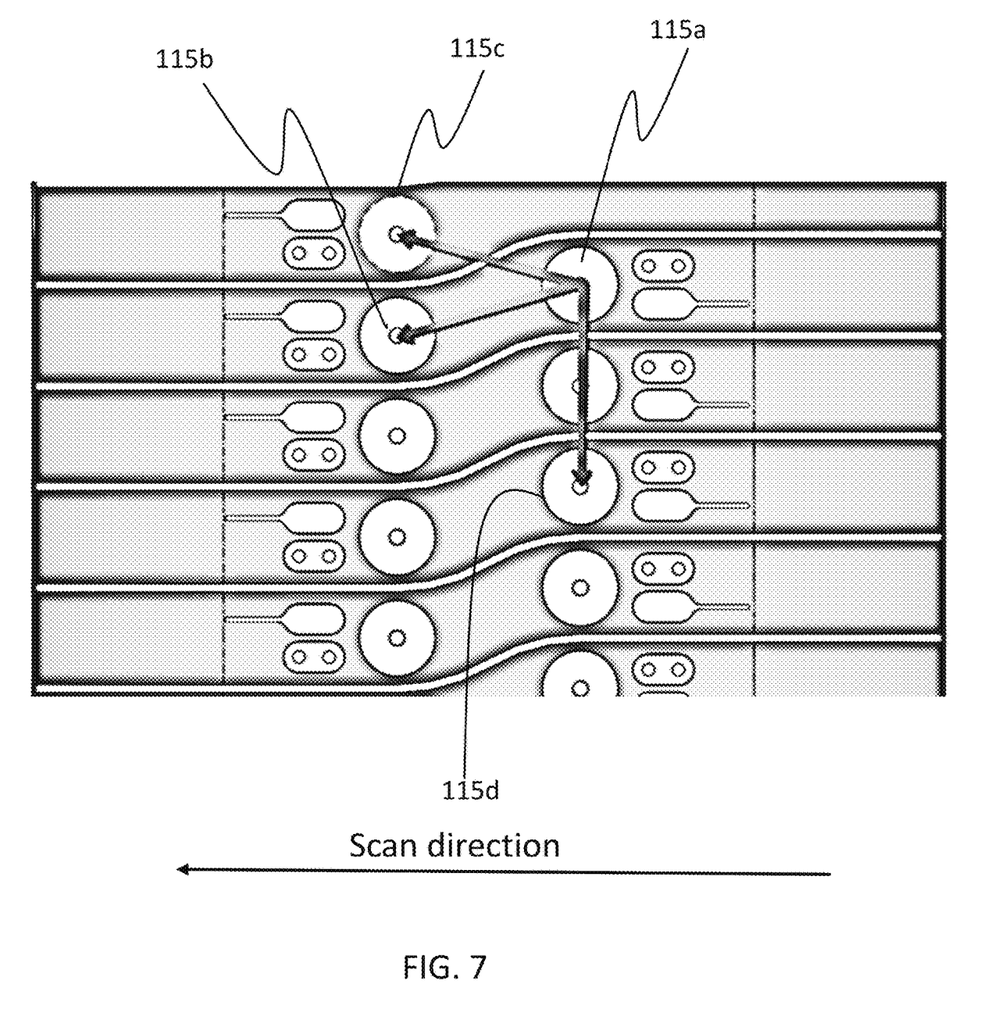
FIG. 7 is a detailed view of the exemplary flex circuit of FIGS. 5A, 5B, and 6, including sensor coils.

In an exemplary embodiment, the slits 115 in the flex circuit 116 are configured in a Z shape with the two coils 115 on each strip 116a being offset from each other with respect to the coil row axes 116f, as best seen in FIGS. 6 and 7. The reason for the Z shape is to place the coils 115 such that three coils 115b, 115c, 115d, which may be used as sense coils, are equidistant from a fourth coil 115a, which may be used as an excitation coil. Placing a plurality of sense coils at different relative angles to the excitation coil with respect to the scan direction increases the ability to detect flaws, because some flaw orientations may be missed with only a single excitation/sense coil pair having a single orientation with respect to the scan direction. Arranging the sense coils 115a, 115b, 115c equidistant from the drive coil 115d simplifies the ability to compare readings between the sense coils.

To limit the complexity of the instrument that the probe connects to and the connecting cable between the two pieces of equipment, the eddy current probe 100 may include a multiplexer that combines a plurality of coil signals onto a single pair of wires. The flex circuit plugs 116 directly into this multiplexer, which is part of the electronics assembly 113 through connectors 113a, 113b. The two connectors 113a, 113b are used to maximize signal trace separation to avoid cross talk and degraded signal quality. By reducing the number of wires in the connector and cable, reliability is increased and the device is easier to use because the connecting cable is less bulky than if individual wires were used for each coil. In a further embodiment, the eddy current signals are digitized at the probe and sent to a probe controller instrument digitally. Likewise, coil energization signals may be sent from the probe controller instrument to the probe and de-multiplexed at the probe by a de-multiplexer or sent in digital form and decoded into analog form at the probe.

Figure 8:
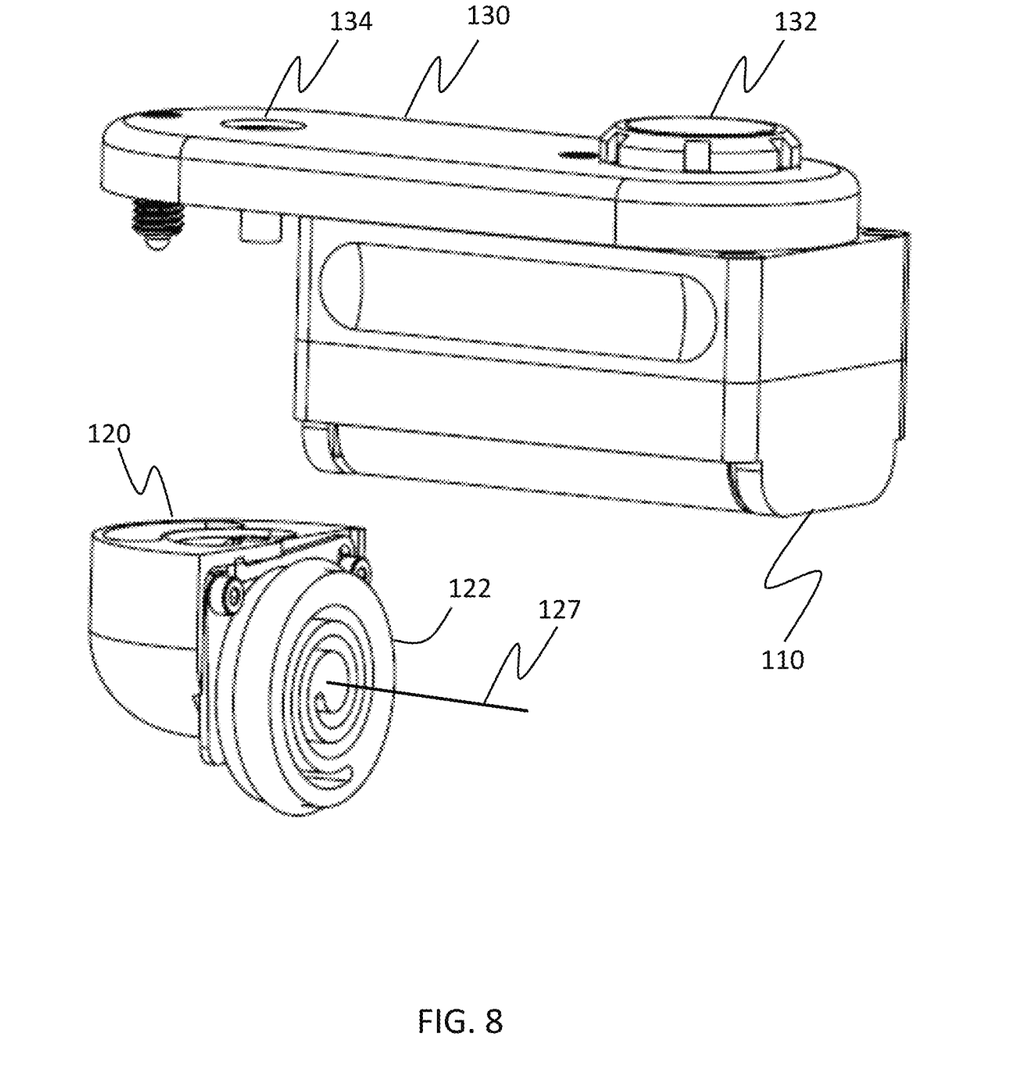
FIG. 8 is an isometric view of the eddy current probe of FIGS. 1 and 2 with the encoder wheel assembly removed for clarity.

In an exemplary embodiment, the eddy current probe includes a rotary encoder for sensing probe linear motion and relative distance moved over an object under test. FIG. 8 shows an exemplary eddy current probe having an eddy current sensor array head 110, an encoder arm 130 and an encoder assembly 120. The encoder assembly 120 is detached to show the encoder wheel 122. Consistent with embodiments described herein, the encoder assembly 120 is rotatable with respect to the eddy current sensor array head 110 because the encoder arm 130 pivots at two rotary joints: 134 and 132. The encoder wheel axis 127 must be kept parallel to the sensor array coil axes (116e, FIG. 6), as this will ensure that the encoder wheel travels in the scan direction of the eddy current sensor head 110. As described earlier, this alignment may be achieved by having fixed locking positions, examples of which are shown in FIG. 3, for encoder assembly rotation and eddy current sensor array head rotation. An adjustable relationship between the eddy current sensor array head 110 and the encoder assembly 120 allows greater flexibility in positioning the encoder and sensor on thin, uneven or obstructed objects under tests. Because the encoder assembly 120 is both attached to the sensor assembly 110 and movable about the sensor assembly, only a single cable is necessary to connect the eddy current probe to a monitoring instrument.

Figure 9:
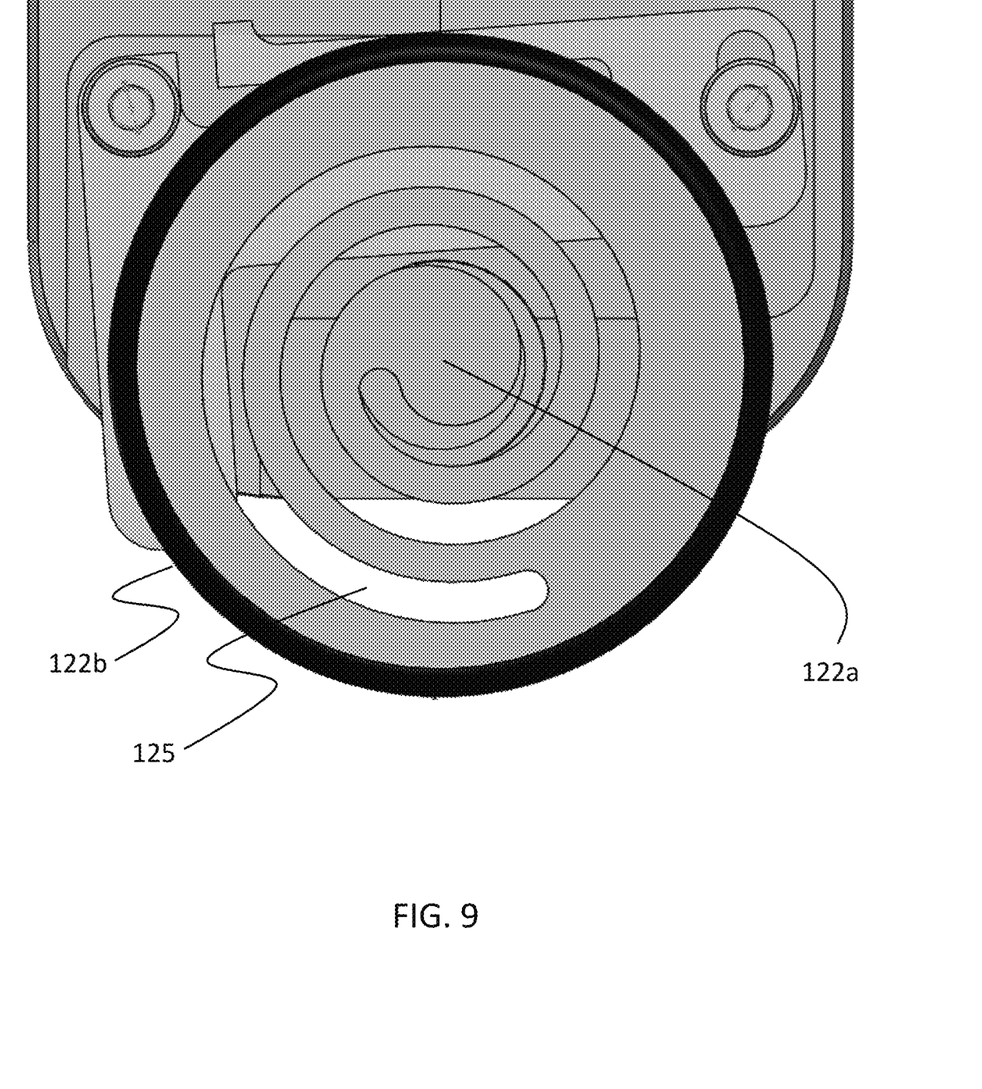
FIG. 9 is a front view of the encoder wheel of FIG. 8.

In an exemplary embodiment, the encoder assembly 120 uses a magnetic sensing element 123, as shown in FIG. 4, to detect rotation of encoder wheel 122 about encoder wheel axis 127. As shown in FIG. 4, magnetic rotary position transducer 123 is mounted in the shaft of the encoder wheel 122. Furthermore, as shown in FIGS. 8 and 9, in an exemplary implementation, encoder wheel 122 is constructed with a spiral cutout 125 located roughly between the wheel's center 122a and its rim 122b. This cutout 125 allows the wheel to communicate orientation to the shaft and the magnet 123 while absorbing small variations in shaft to surface-under-test distance that are likely to occur because of welds, dents, cracks and similar surface anomalies. A detector circuit (not shown) in the encoder assembly detects the angular position of the magnet 123. This angular position may be transmitted directly to an instrument that is connected to the eddy current probe or may be converted at the encoder assembly into distance travelled and direction data (forward or backward), that may be sent to the instrument.

As briefly described above, guide frame 117 is configured to slidingly engage the material under test. In an exemplary embodiment, the amount of force that can be applied to the face of the probe on the wear surface 118 is limited by side rails 117a, 117b in guide frame 117. These side rails limit the compression of the foam coil support 114 and stabilize the probe so that the coil 115 orientation and distance from the material under test remains constant. Such stabilization reduces spurious signals in the eddy current data, which can result, for example, from the probe coils lifting off the surface of the material under test. Alternate versions of the guide frame 117 may include side rails designed to accommodate inspection of cylindrical or other non-flat parts.

In some embodiments, flex circuit 116 may not be durable enough to withstand repeated abrasion against potentially rough metal surfaces under test (e.g., welds, etc.). To provide an acceptable product life for the probe, wear surface 118 is placed between the flex circuit 116 and the material under test, as described briefly above with respect to FIG. 4. Consistent with embodiments described herein, wear surface 118 may be formed of a protective and flexible material that enables allow the fingers 116a of the flex circuit 116 to move freely and place the coils 115 in close proximity to the material under test. By not bonding the wear surface 118 directly to the flex circuit 116, the two components act independently and reduce stiffness. This contributes to maximum flexibility, reduced coil lift off and better eddy current signal quality.

Having a wear surface 118 that is separate from the flex circuit 116 also allows the wear surface to be easily replaced. In an embodiment, the wear surface 118 may be bonded to the guide frame 117 and the assembly of the two components (wear surface and guide frame) may be replaced as a unit. High flexibility and durability are particularly desirable when inspecting welds and other harsh or abrasive surfaces. A variety of materials may be used as a wear surface, including plastic films and fabrics. In a preferred embodiment, a fabric having a surface composed of small guard plates that substantially increase the wear resistance may be used. An exemplary such fabric is available from Superfabric™, Oakdale, Minn.

Although an exemplary flexible eddy current probe is described above for use with in inspecting a pipe weld, it should be understood that the embodiments described herein may have applicability in a variety of devices.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A flexible eddy current sensor array for non-destructive inspection of a metal object comprising:
   a flexible printed circuit arranged in a substantially rectangular configuration having first and second parallel sides, third and fourth parallel sides, and a plurality of adjacent strips of flexible printed circuit having first and second ends, said first and second ends being contiguous with said first and second parallel sides, respectively,
   each of said strips containing a pair of coils, a first coil being proximate to said first end and a second coil being proximate to said second end, each of said coils being configured to excite an eddy current in the metal object or to sense said eddy current,
   each of said strips being independently flexible from one another,
   wherein said flexible eddy current sensor array is configured to be scanned over the metal object in a direction orthogonal to said first and second parallel sides.

2. The flexible eddy current sensor array of claim 1, further comprising a resilient compliant pad that engages at least a portion of a first face of said flexible printed circuit, said resilient pad providing support for said strips.

3. The flexible eddy current sensor array of claim 2, further comprising a flexible wear surface proximate to a second face of said flexible printed circuit.

4. The flexible eddy current sensor array of claim 3, further comprising first and second rigid guides arranged adjacent to said third and fourth sides of said flexible printed circuit, respectively, said first and second rigid guides being configured to limit flexure of said flexible printed circuit during scanning of the metal object.

5. The flexible eddy current sensor array of claim 1, wherein said first and second ends of said strips of flexible printed circuit are offset with respect to each other such that a first strip having a first strip proximal coil and a first strip distal coil is arranged such that said first strip proximal coil is equidistant from said first strip distal coil and from a second strip distal coil said second strip being adjacent to said first strip and said second strip distal coil being adjacent to said first strip distal coil.

6. The flexible eddy current sensor array of claim 5, further comprising a third strip adjacent to said first strip and a fourth strip adjacent to said third strip, said fourth strip having a fourth strip proximal coil, wherein said first and second ends of said first, second, third and fourth strips of flexible printed circuit are offset with respect to each other such that said first strip proximal coil is equidistant from said second strip distal coil, said first strip distal coil and said fourth strip proximal coil.

7. The flexible eddy current sensor array of claim 1, further comprising a plurality of electrical contacts located along one or both of said first and second parallel sides of said flexible circuit.

8. The flexible eddy current sensor array of claim 1, wherein said coils are bobbin coils attached to said flexible printed circuit.

9. The flexible eddy current sensor array of claim 1, wherein said coils are formed integrally on said flexible printed circuit.

10. The flexible eddy current sensor array of claim 1, further comprising a multiplexer and wherein said multiplexer combines a plurality of signals produced by said coils.

11. The flexible eddy current sensor array of claim 1, further comprising a demultiplexer and wherein said demultiplexer outputs a plurality of drive signals to drive a portion of said coils.

12. An eddy current probe for non-destructive inspection of a metal object comprising:
the flexible eddy current sensor array of claim 1;
a rotary encoder; and
an encoder arm which is connected by a first single axis joint to said flexible eddy current sensor array and is also connected by a second single axis joint to said rotary encoder.

13. The eddy current probe of claim 12 wherein said rotary encoder includes a magnetic rotary position transducer axially coupled to an encoder wheel, said encoder wheel configured to rotate across the metal object as the probe is scanned over the metal object.

14. The eddy current probe of claim 13 wherein said encoder arm is configured to limit the rotary position of said rotary encoder with respect to said encoder arm to a fixed number of positions and wherein said encoder arm is further configured to limit the rotary position of said flexible eddy current sensor array with respect to said encoder arm to a corresponding fixed number of positions, such that said rotary encoder wheel rotates in a scan direction perpendicular to said first and second flexible circuit sides.

15. The eddy current probe of claim 12, wherein said rotary encoder comprises a wheel configured for contact with the metal object, said wheel having a spiral opening between its center and its rim.

16. A flexible eddy current sensor array for non-destructive inspection of a metal object comprising:
a flexible printed circuit arranged in a substantially rectangular configuration having first and second parallel sides, third and fourth parallel sides, and a plurality of adjacent strips of flexible printed circuit having first and second ends, said first and second ends being contiguous with said first and second parallel sides, respectively,
each of said strips containing at least one of a current excitation component configured to excite an eddy current in the metal object or a current sensing component configured to sense an eddy current,
each of said strips being independently flexible from one another,
wherein said flexible eddy current sensor array is configured to be scanned over the metal object in a direction orthogonal to said first and second parallel sides.

* * * * *